(12) United States Patent
Itonori et al.

(10) Patent No.: US 7,623,716 B2
(45) Date of Patent: Nov. 24, 2009

(54) LANGUAGE TRANSLATION DEVICE, IMAGE PROCESSING APPARATUS, IMAGE FORMING APPARATUS, LANGUAGE TRANSLATION METHOD AND STORAGE MEDIUM

(75) Inventors: Katsuhiko Itonori, Ashigarakami-gun (JP); Hiroaki Ikegami, Ashigarakami-gun (JP); Hideaki Ashikaga, Ashigarakami-gun (JP); Shunichi Kimura, Ashigarakami-gun (JP); Hiroki Yoshimura, Ashigarakami-gun (JP); Masanori Onda, Ashigarakami-gun (JP); Masahiro Kato, Ashigarakami-gun (JP); Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 835 days.

(21) Appl. No.: 11/220,518

(22) Filed: Sep. 8, 2005

(65) Prior Publication Data

US 2006/0215909 A1    Sep. 28, 2006

(30) Foreign Application Priority Data

Mar. 23, 2005  (JP) ............................. 2005-084840

(51) Int. Cl.
*G06K 9/72* (2006.01)
*G06K 9/34* (2006.01)
*G06F 17/28* (2006.01)

(52) U.S. Cl. .................. 382/229; 382/175; 382/176; 382/180; 704/2; 434/157

(58) Field of Classification Search ......... 382/175–180, 382/182–187
See application file for complete search history.

(56) References Cited

U.S. PATENT DOCUMENTS 3,750,112 A * 7/1973 Manly ................... 358/1.18
5,574,802 A * 11/1996 Ozaki ..................... 382/176
5,588,072 A * 12/1996 Wang ...................... 382/176

(Continued)

FOREIGN PATENT DOCUMENTS

JP          A-61-021570          1/1986

(Continued)

OTHER PUBLICATIONS

Haralick, R., "ment image understanding: Geometric and logical layout", 1994, "in Proc. of the Conference on Computer Vision and Pattern Recognition".*

(Continued)

*Primary Examiner*—Bhavesh M Mehta
*Assistant Examiner*—Gandhi Thirugnanam
(74) *Attorney, Agent, or Firm*—Oliff & Berridge, PLC (57) ABSTRACT

A translation device analyses image data that includes characters, to separate and extract a character region, and another region whose structural elements differ from those of the character region; recognizes characters in the region determined to be the character region; extracts a character string related to the other region, from a result of the character recognition, to associate the character string with the character region from which the character string is extracted and the other region; translates the resulting recognized characters; and, based on the association between the character string and the other character region, pastes the resulting translation that includes the character string onto the same page as the other region that is associated with the character string.

9 Claims, 5 Drawing Sheets

U.S. PATENT DOCUMENTS

| | | | | |
|---|---|---|---|---|
| 5,680,479 | A * | 10/1997 | Wang et al. | 382/176 |
| 5,784,487 | A * | 7/1998 | Cooperman | 382/175 |
| 5,915,039 | A * | 6/1999 | Lorie et al. | 382/230 |
| 5,956,422 | A * | 9/1999 | Alam | 382/181 |
| 6,081,616 | A * | 6/2000 | Vaezi et al. | 382/171 |
| 6,470,095 | B2 * | 10/2002 | Mahoney et al. | 382/199 |
| 6,539,116 | B2 | 3/2003 | Takaoka | 382/229 |
| 6,567,546 | B1 * | 5/2003 | Eguchi et al. | 382/181 |
| 6,687,404 | B1 * | 2/2004 | Hull et al. | 382/226 |
| 6,826,727 | B1 * | 11/2004 | Mohr et al. | 715/235 |
| 7,325,735 | B2 * | 2/2008 | Kurzweil et al. | 235/454 |
| 7,336,378 | B2 * | 2/2008 | Ichikawa et al. | 358/1.11 |
| 7,496,230 | B2 * | 2/2009 | Chen et al. | 382/182 |
| 2002/0025081 | A1 * | 2/2002 | Kumazawa | 382/289 |
| 2004/0146199 | A1 * | 7/2004 | Berkner et al. | 382/176 |
| 2005/0286743 | A1 * | 12/2005 | Kurzweil et al. | 382/114 |
| 2006/0204094 | A1 * | 9/2006 | Koyama et al. | 382/176 |

FOREIGN PATENT DOCUMENTS

| | | |
|---|---|---|
| JP | A-05-101039 | 4/1993 |
| JP | A 05-108716 | 4/1993 |
| JP | A-06-083825 | 3/1994 |
| JP | A-08-161517 | 6/1996 |

OTHER PUBLICATIONS

Bokser, M., "Omnidocument technologies", Jul. 1992, Proceedings of the IEEE, vol. 80, Issue: 7.*

Japanese Office Action corresponding to Japanese Patent Application 2005-084840.

* cited by examiner

LANGUAGE TRANSLATION DEVICE, IMAGE PROCESSING APPARATUS, IMAGE FORMING APPARATUS, LANGUAGE TRANSLATION METHOD AND STORAGE MEDIUM

BACKGROUND OF THE INVENTION

1. Field of the Invention

The present invention relates to translation in which characters or documents are converted from one language into another.

2. Description of the Related Art

With the arrival of the age of global communications, it has recently become quite common to use computers to translate phrases of one language into phrases of another language by analyzing a document's structure using dictionary data or predetermined algorithms, or the like, so as to substitute characters with other characters, in what is known as "machine translation". Such machine translation is performed based on character information of document data; and if the document has not been converted to a digital form, i.e., there is no document data, then the printed original is read by a scanning device, and an OCR (optical character reader) processing is performed by carrying out character recognition processing to extract character information before the translation processing can occur.

Since a length of a sentence differs before and after translation, if images of drawings, tables and photographs and the like are included in a manuscript, then there may be a shift in the position of the images.

SUMMARY OF THE INVENTION

The present invention has been made in view of the above circumstances, and provides a translation device, an image processing apparatus, an image forming apparatus, a translation method and a computer readable storage program having stored a program that are capable of providing a translated document that is as easy to read as the original, by arranging a character string of the translated text in a position that is proximate to a region associated with the character string of the original.

In one aspect, the present invention provides a translation device that has: a region extracting unit that analyses image data that includes characters, and that separates and extracts both a character region, and another region whose structural elements differ from those of the character region; a character recognition unit that recognizes characters in the region that is determined to be the character region by the region extracting unit; an associating unit that extracts from a result of character recognition carried out by the character recognition unit a character string related to the other region, and that associates the character string with the character region from which the character string is extracted and the other region; a translating unit that translates the resulting recognized characters; and a pasting unit that, based on the association between the character string and the other character region, pastes the resulting translation that includes the character string onto the same page as the other region that is associated with the character string.

BRIEF DESCRIPTION OF THE DRAWINGS

Embodiments of the present invention will be described in detail based on the following figures, wherein.

DETAILED DESCRIPTION OF THE INVENTION

Embodiments of the present invention will now be described below with reference to the drawings.

Figure 1:
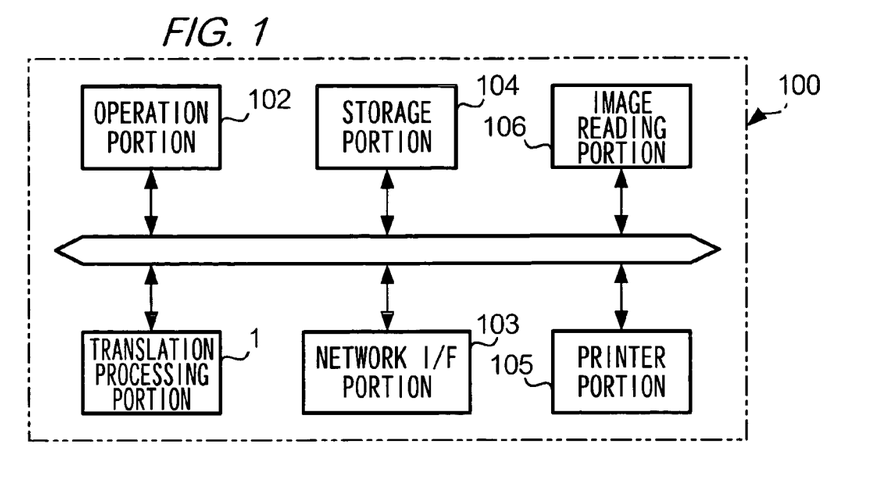
FIG. 1 is a block diagram showing an image forming apparatus according to an embodiment of the present invention.

FIG. 1 is a drawing showing an image forming apparatus 100 that is provided with a translation function according to an embodiment of the present invention. As shown in FIG. 1, the image forming apparatus 100 has a translation processing portion 1, an operation portion 102, a network interface (hereinafter, I/F) portion 103, a storage portion 104, a printer portion 105 and an image reading portion 106.

The printer portion 105 is provided with a photosensitive body, an exposure portion, a developing portion, a transfer portion and a fixing portion (none of which are shown). The printer portion 105 forms a toner image based on image data supplied from the translation processing portion 1, and fixes the image onto a recording material, such as paper. The operation portion 102 is provided with a display unit made from a liquid crystal display (not shown) and various buttons, and the like, whereby instructions can be input by a user. The user uses the operation portion 102 to select a paper to be used, and to set the print settings.

The image reading portion 106 scans the image of the manuscript that is placed on the reading face to obtain image data. The storage portion 104 stores the image data, for example, that is read by the image reading portion 106. Data is communicated between the translation processing portion 1, the operation portion 102, the storage portion 104, the printer portion 105 and the image reading portion 106, and the like, using the network I/F portion 103.

Figure 2:
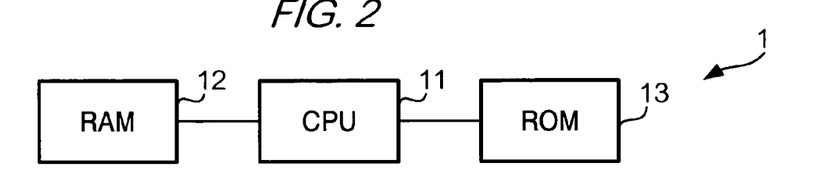
FIG. 2 is a diagram showing the structure of a translation processing portion of the image forming apparatus according to the same embodiment.

As shown in FIG. 2, the translation processing portion 1 is provided with a CPU (central processing unit) 11, a RAM (random access memory) 12 and a ROM (read only memory) 13, and the translation processing portion 1 performs various calculations in order to carry out various image processing and translation processing operations on the image data that is input, in addition to controlling the various parts of the image forming apparatus 100. At this time, the image data is temporarily stored in the RAM 12. Furthermore, there are contained in the ROM 13 various image processing programs and translation processing programs necessary for carrying out image data processing and translation processing. An association table, which will be described later, is also stored in the RAM 12.

Figure 6A:
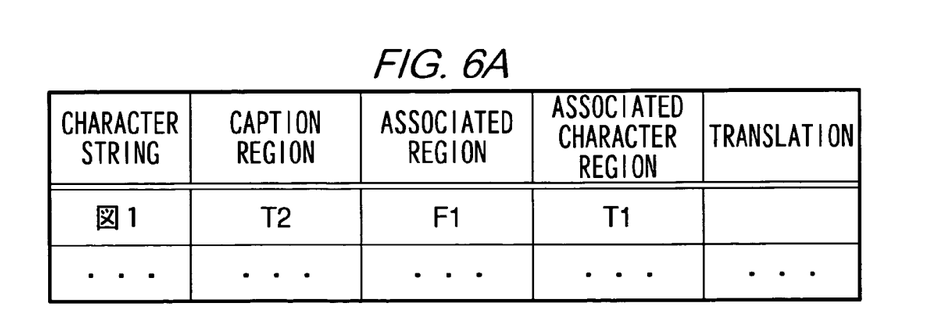
FIGS. 6A and 6B are diagrams each showing an association table in the translation processing portion.
Figure 6B:
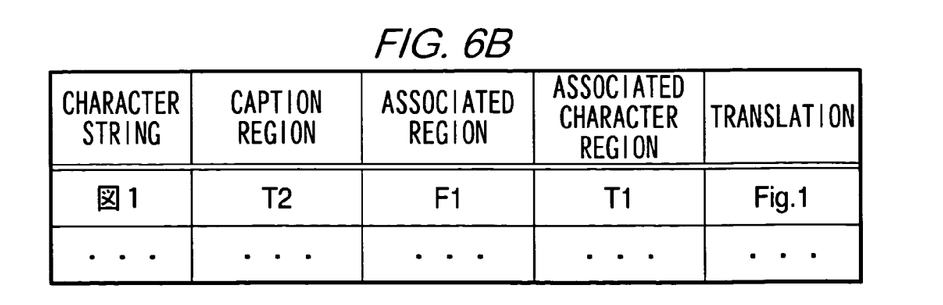

As shown in FIGS. 6A and 6B, when the association table associates a character region with a graphic region, using a diagram number in the character region as the basis, a corresponding caption region, a corresponding graphic region, a corresponding character region and a translation of the diagram number are associated with the diagram number.

Here, "caption" refers to an explanation that is attached either above or below the diagram or table.

Figure 3:
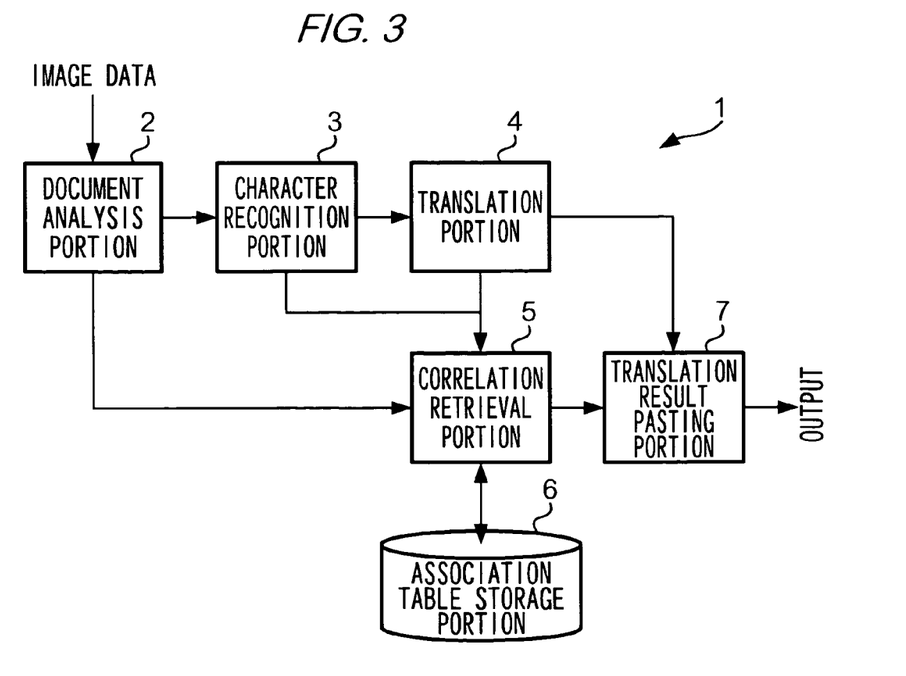
FIG. 3 is a functional block diagram showing the structure of the translation processing portion of the image forming apparatus according to the same embodiment.

Next a description follows of the function of the translation processing portion 1, with reference to a functional block diagram of FIG. 3.

The translation processing portion 1 has: a document analysis portion 2; a character recognition portion 3; a translation portion 4; a correlation retrieval portion 5; an association table storage portion 6; and a translation result pasting portion 7.

The document analysis portion 2 analyses image data read by the image reading portion 106, and divides the image data into structural elements such as character regions and graphic regions. In the present embodiment, other, non-text regions including, for example, footnotes other than characters or graphics, are extracted as graphic regions.

Figure 4:
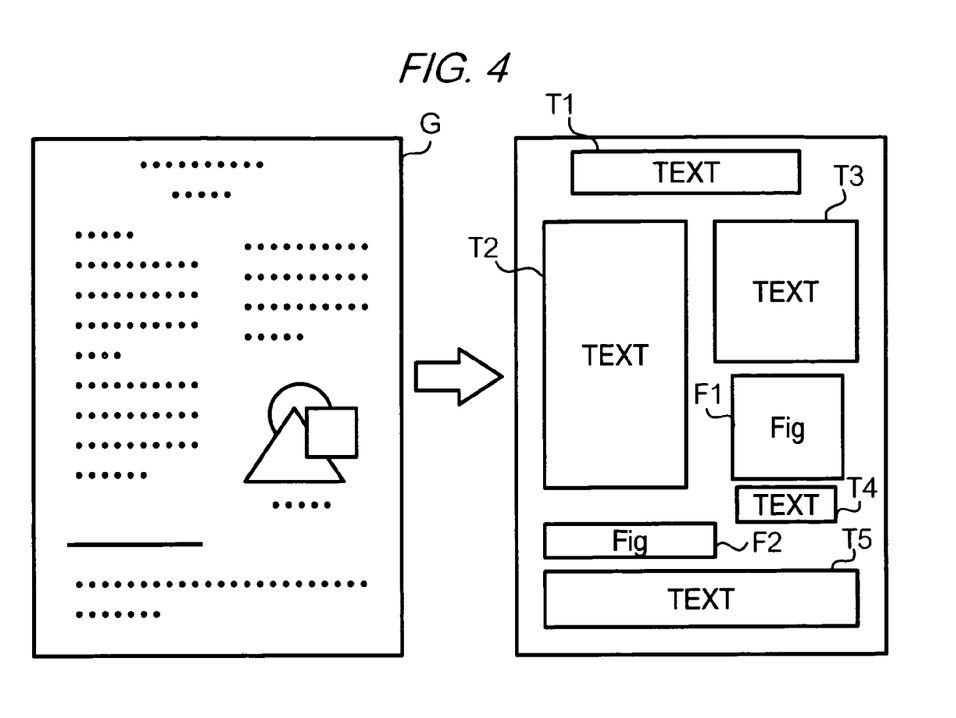
FIG. 4 is a specific example showing the process in a document analysis portion of the translation processing portion.

More specifically, as shown in FIG. 4, when an image G is processed by the document analysis portion 2, the document analysis portion 2 separates the portions into specific regions; namely, a title portion to a character region T1, a character region on the left side to a character region T2, a character region on the upper right to a character region T3, a figure on the lower right to a graphic region F1, a caption portion below the figure to a character region T4, a line portion at the lower left to a graphic region F2 and a caption portion below the line portion to a character region T5.

The character recognition portion 3 recognizes characters in the regions that are specified to be character regions by the document analysis portion 2. That is to say, the character recognition portion 3 performs an OCR processing, where the characters of the character regions are read as image data and are recognized. In this case, character recognition processing is performed on the character regions T1 to T5.

The translation portion 4 compares the type of language of the character data read in by the character recognition portion 3 with language information in the ROM 13, identifies that language, and then carries out translation processing of the character data, creating translated data that has been translated from, for example, Japanese to English.

The correlation retrieval portion 5 searches for a diagram number from the character data before translation for each character region T1 to T5 to specify a character string relating to the diagram number through using the search, and writes the character string, a caption region, and an associated character region onto the association table of the association storage portion 6 (see FIG. 6A, for example).

Since the arrangement of the regions is known, as shown in FIG. 4, this processing starts by extracting the graphic regions F1 and F2 that are present on this page, specifies a character region that is assumed to be the caption portion of the graphic region F1 as being the character region T4, and retrieves a diagram number from the character data of the character region T4. In a similar manner, this process specifies the character region that is assumed to be the caption portion of the graphic region F2 as being the character region T5, and retrieves a diagram number from the character data of the character region T5. Character strings relating to diagram numbers and character regions corresponding to the caption portion are thus specified and extracted. Moreover, by taking the extracted character string to be the object of the search, a full text search is performed on the remaining character regions T1 to T3 in sequence and a character region that includes the first appearance of the character string (closest to the start of the document) is set to be the associated character region.

The correlation retrieval portion 5 writes the specified, extracted character strings, character regions that correspond to caption portions, regions corresponding to the figure, and character regions that include the character strings onto the association table of the association table storage portion 6. Moreover the correlation retrieval portion 5 reads out a translation of the character string from the translated data, and writes the translation onto the association table.

A character region corresponding to a caption portion may be determined on the basis that it is adjacent to the graphic region, and is a relatively short character region. Moreover, by judging, on the basis of a region's size and position, whether a region is a graphic region, it is possible to prevent a problem of mistakenly recognizing a line portion that separates main text from footnotes as a graphic region, which would result in further misrecognition of a character region that actually corresponds to a footnote as corresponding to a caption region.

The translation result pasting portion 7 pastes the translated text and the graphics onto a page using a predetermined process, via a pasting process, which will be described below. Then, the data that has undergone the predetermined process is temporarily stored in the RAM 12 as image data. Here, for the benefit of convenience and to make the description easier to understand, description will be made of the physical operation for pasting the translated text and the graphics onto a page.

Following is a description of the pasting process, which is illustrated by way of a specific example.

Figure 7A:
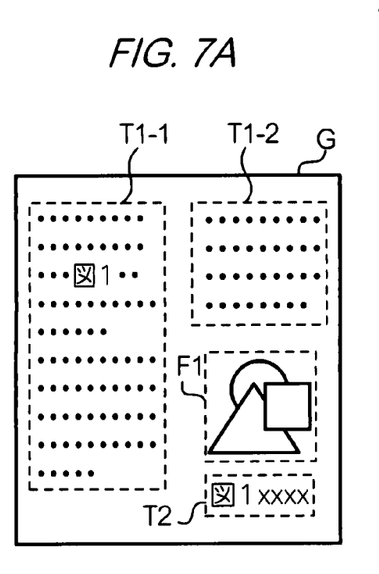
FIGS. 7A to 7C are diagrams for explaining the pasting process in the translation processing portion.
Figure 8A:
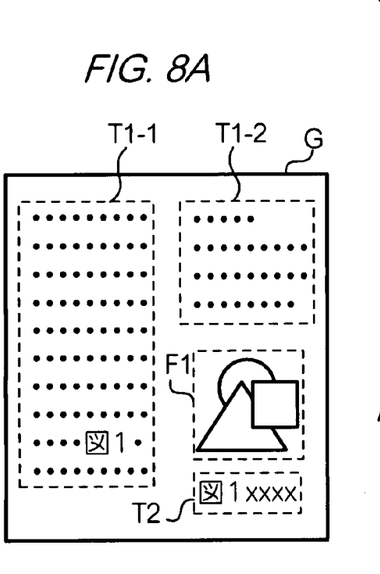
FIGS. 8A to 8C are diagrams for explaining the pasting process in the translation processing portion.

In this example, images G shown in FIG. 7A and FIG. 8A each are translated from Japanese to English. By processing the image data of the image G with the document analysis portion 2, it is recognized that a character string T1-1 is arranged on the left side, a character region T1-2 on the upper right, a graphic region F1 on the lower right and a character region T2 that corresponds to a caption portion, below the graphic region F1. Moreover, the correlation retrieval portion 5 performs the process to create the association table shown in FIG. 6B. By the processes performed by the document analysis portion 2, the character recognition portion 3, the translation portion 4 and the correlation retrieval portion 5 of the translation processing portion 1, the following is written into the association table of the association table storage portion 6; namely, the character string to be "図1"(English translation: "FIG. 1"), the character region corresponding to the caption portion to be T2, the region corresponding to the figure to be F1, the character region that includes the character string to be T1 (T1-1+T1-2), and the translation of the character string to be "FIG. 1".

Figure 5:
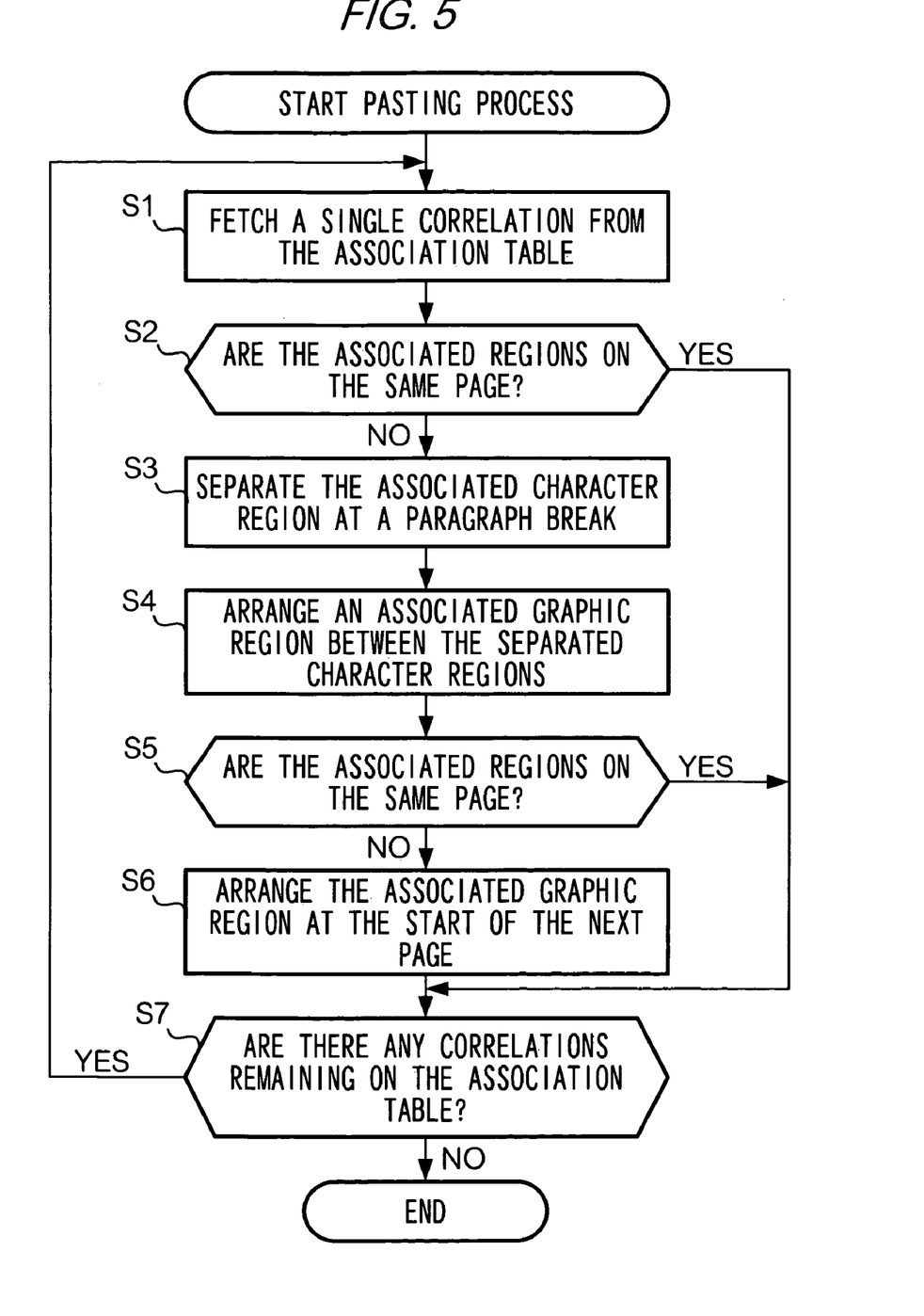
FIG. 5 is a flowchart showing a pasting process in a translation result pasting portion of the translation processing portion.

Here, the pasting process will be described with reference to the flow chart of the process shown in FIG. 5

First of all, the CPU 11 fetches a single correlation from the association table (Step S1). In this case, the regions correlated to the character string "図1"(English translation: "FIG. 1"), for example, are fetched.

Figure 7B:
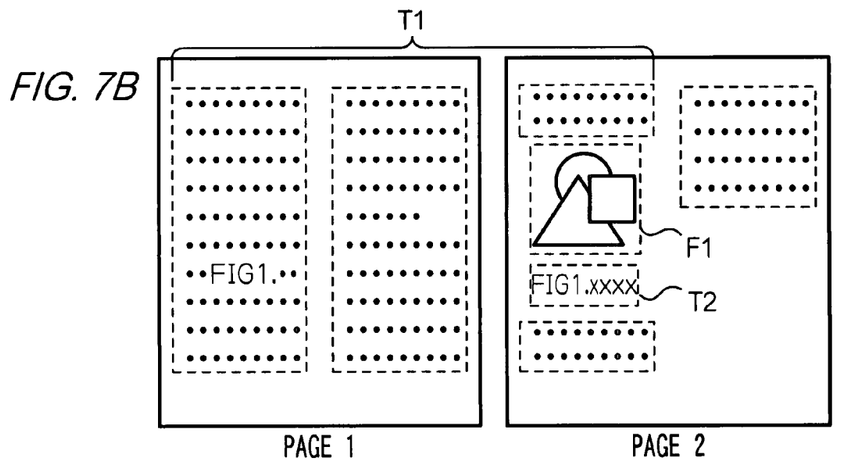

Next, the CPU 11 determines whether or not the regions associated with the fetched character string "図1"are present on a single page (Step S2). This determination is performed because, since the length of a single word increases when Japanese is translated to English, the length of one sentence and one paragraph also increases, and the character region required for pasting will naturally increase. In this example, as shown in FIG. 7B, the original, which was a single page, now covers two pages, and the translation "FIG. 1" ends up on a separate page to the graphic region F1, and therefore it is determined as No in Step S2.

Figure 7C:
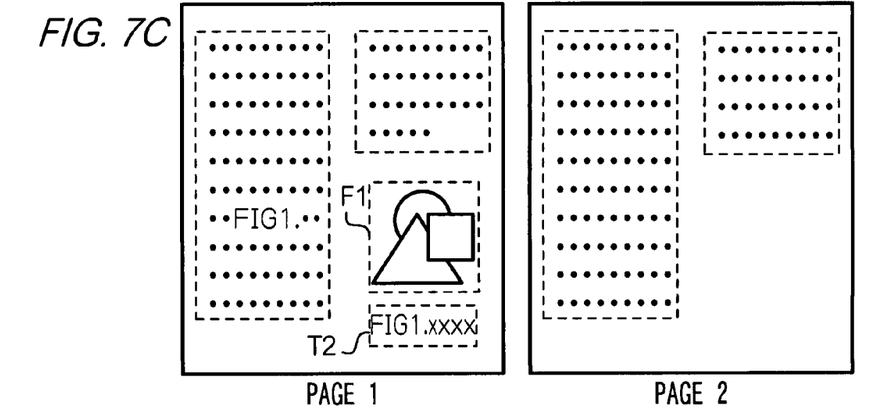

The CPU 11 then separates the associated character region T1 at a paragraph break (Step S3), and arranges the graphic region F1 between the separated character regions, as shown in FIG. 7C (Step S4).

The CPU 11 again judges whether or not the regions associated with the character string "図 1"are present on a single page (Step S5). If the translation "FIG. 1" and the graphic region F1 are disposed on the same page, (Step S5; YES) as shown in FIG. 7C, then the procedure proceeds to Step S7, the CPU 11 determines whether or not there are still other correlations by reference to the association table, and if there are other correlations that have not been processed (Step S7; YES), then the procedure repeats the processes from Step S1 onward. If the correlations have all been processed (Step S7; NO), then the CPU 11 concludes the pasting process.

Figure 8B:
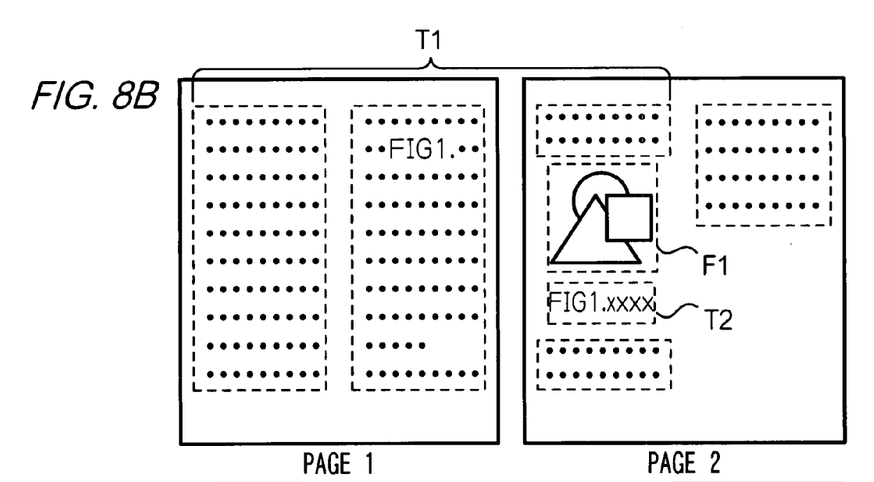

On the other hand, if the translation "FIG. 1" and the graphic region F1 are not disposed on the same page as shown in FIG. 8B (Step S5; NO), then the CPU 11 arranges the graphic region F1 and the character region F2 at the top of the next page, as shown in FIG. 8C (Step S6).

The CPU 11 then carries out the processing of the remaining correlations, with reference to the association table, and when the arrangement of the correlations is complete (Step S7; NO), the CPU 11 then stores the data of the processed pages in the RAM 12 as image data and concludes the process.

In this example, because the translation processing portion 1 is configured as one part of the image forming apparatus 100, when a print command arrives from a user operating the operation portion 102, the translated image data processed by the translation processing portion 1 is output to the printer portion 105, and the printer portion 105 prints the image data on paper.

Figure 8C:
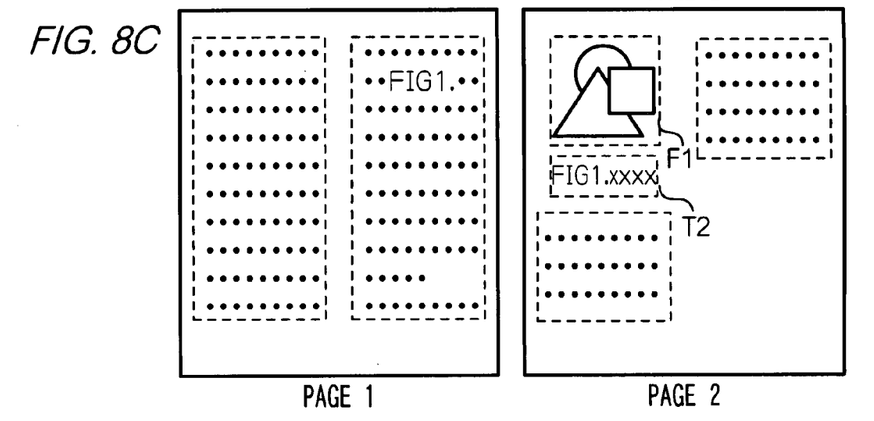

In this way, the image forming apparatus 100 according to the present embodiment is capable of printing the translated document on paper as an image in which the character string in the original, and the region associated with that character string are disposed in mutually proximate locations, as shown in FIG. 7C and FIG. 8C. Thus, the user is able to obtain a translation that is as easy to read as the original.

It should be noted that the present embodiment has been described using an example in which the translated character region is longer than the equivalent character region of the original. However, it is also possible to achieve a similar effect by carrying out the process of the translation processing portion 1 also in a case in which the translated character region is shorter than the region of the original.

Furthermore, in the present embodiment, the non-text regions have been described as graphic regions, however the present invention is not limited thereto, and can be applied to footnotes, headnotes and photographs.

In this case, the character string to be extracted will be "note", or "photograph" or the like.

Moreover, it goes without saying that the language of the original and the translation is not limited to those of the embodiment described above, and the present invention can also be applied to, for example. German, French, Russian, Spanish, Chinese or Korean, and so on, in addition to Japanese and English.

It should also be noted that the pasting process of the above-noted embodiment is described such that the processes in Step S3 to Step S5 are performed only once. However, if there are plural paragraphs in the character region T1, then these processes may be repeated, and as a result, the process in Step S6 may be performed when the translation "FIG. 1" is not disposed on the same page as the graphic region F1. Moreover, if there are plural paragraphs in the character region T1 in the process in Step S3, then the CPU 11 may carry out a process such that the graphic region F1 is disposed after the end of the paragraph in which the character string "図 1"appears for the first time.

Furthermore, while in the embodiment, the present invention has been described as being embodied by the image forming apparatus 100, the present invention is not limited to such an embodiment. For example, the present invention may be provided as a translation apparatus or an image processing apparatus having only the function of the translation processing portion 1 of the above-noted image forming apparatus 100. In this case, the translation device or the image forming apparatus may be an ASIC (application specific integrated circuit) provided with the function of the above-noted translation processing portion 1. The present invention may also be provided in the form of a translation processing program PRG that is recorded on various types of recording media, such as magnetic disks, floppy disks®, CDs (compact disks), DVDs (digital versatile disks) and RAM, or the like.

In one aspect, the present invention provides a translation device that has: a region extracting unit that analyses image data that includes characters, and that separates and extracts both a character region, and another region whose structural elements differ from those of the character region; a character recognition unit that recognizes characters in the region that is determined to be the character region by the region extracting unit; an associating unit that extracts from a result of character recognition carried out by the character recognition unit a character string related to the other region, and associates the character string with the character region from which the character string is extracted and the other region; a translating unit that translates the resulting recognized characters; and a pasting unit that, based on the association between the character string and the other character region, pastes the resulting translation that includes the character string onto the same page as the other region that is associated with the character string.

According to an embodiment of the invention, the other region may be a graphic region and the character string may be a diagram number, and the diagram number corresponding to the graphic region may be associated with the diagram number in the character region.

According to another embodiment of the invention, the other region may be a footnote region and the character string may be a footnote number; and the footnote number corresponding to the footnote may be associated with the footnote number in the character region.

According to still another embodiment of the invention, the other region may be a headnote region and the character string may be a headnote number, and the headnote number corresponding to the headnote may be associated with the headnote number in the character region.

According to an embodiment of the invention, if the character region that includes the character string is divided into paragraphs and if there is space to dispose the other region on the same page directly after the paragraph that includes the character string, then the pasting unit may separate the character region and arrange the other region directly after the paragraph that includes the character string.

According to another embodiment of the invention, if the character region that includes the character string is divided into paragraphs, and the paragraph that includes the character string is the last paragraph disposed on a page, then the pasting unit may separate the character region, and arrange the paragraph that includes the character string and the other region at the top of the next page.

According to still another embodiment of the invention, if there are plural character regions that include the character string, then the pasting unit may arrange the other region directly after the character region in which the character string first appears.

In another aspect, the present invention provides an image processing apparatus that is provided with an image reading unit that reads in printed images and that outputs the images as image data, and with any one of the above translation devices.

In still another aspect, the present invention provides an image forming apparatus that is provided with an image forming unit that forms images onto a recording material, and with any one of the above translation devices.

In one aspect, the present invention provides a translation method that includes analyzing image data, and extracting a character region, and another region whose structural elements differ from those of the character region; recognizing characters in the region that is determined to be the character region by the analysis of the image data; extracting a character string that is related to the other region, from a result of the character recognition, and associating the character string with the character region from which the character string is extracted and the other region; translating the resulting recognized characters; and pasting, based on the association between the character string and the other character region, the resulting translation that includes the character string onto the same page as the other region that is associated with the character string.

In another aspect, the present invention provides a storage program that stores a program that includes functions of analyzing image data; extracting a character region, and another region whose structural elements differ from those of the character region; recognizing characters in the region that is determined to be the character region as a result of the analysis of the image data; extracting a character string that is related to the other region, from a result of the character recognition, and associating the character string with the character region from which the character string is extracted and the other region; translating the resulting recognized characters; and pasting, based on the association between the character string and the other character region, the resulting translation that includes the character string onto the same page as the other region that is associated with the character string.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-84840 filed on Mar. 23, 2005, including specification claims, drawings and abstract is incorporated herein by reference in its entirety.

What is claimed is:

1. A translation device comprising:
a region extracting unit that extracts a character region and a separate region from image data showing an image including characters, the separate region having structural elements different from structural elements of the character region;
a character recognition unit that recognizes characters in the region that is determined to be the character region by the region extracting unit;
a specifying unit that specifies a caption region from within the character region, the caption region being a region having a predetermined positional relationship with the separate region, the caption region having a size that satisfies a predetermined condition;
an associating unit that extracts, from a result of character recognition performed by the character recognition unit, a character string included in the caption region specified by the specifying unit, and that associates the character string with the character region from which the character string is extracted and the separate region;
a translating unit that translates to another language the resulting recognized characters; and
a pasting unit that, based on the association between the character string and the other character region, pastes the resulting translation that includes the character string onto the same page as the separate region that is associated with the character string.

2. The translation device according to claim 1,
wherein the separate region is a graphic region and the character string is a diagram number; and
wherein the diagram number corresponding to the graphic region is associated with the diagram number in the character region.

3. The translation device according to claim 1,
wherein if the character region that includes the character string is divided into paragraphs, if the character region includes the character string and if there is space to dispose the separate region on the same page directly after one of the paragraphs that includes the character string, then the pasting unit separates the character region and arranges the separate region directly after the paragraph that includes the character string.

4. The translation device according to claim 1,
wherein if the character region that includes the character string is divided into paragraphs, includes the character string and one of the paragraphs that includes the character string is a last paragraph disposed on a page, then the pasting unit separates the character region, and arranges the paragraph that includes the character string and the separate region at a top of a next page.

5. The translation device according to claim 1,
wherein if there is a plurality of character regions that include the character string, then the pasting unit arranges the separate region directly after one of the plurality of character regions in which the character string first appears.

6. An image processing apparatus comprising:
an image reading unit that reads in printed images and that outputs the images as image data; and
a translation device comprising:
a region extracting unit that extracts a character region and a separate region from image data showing an image including characters, the separate region having structural elements different from structural elements of the character region;

a character recognition unit that recognizes characters in the region that is determined to be the character region by the region extracting unit;

a specifying unit that specifies a caption region from within the character region, the caption region being a region having a predetermined positional relationship with the separate region, the caption region having a size that satisfies a predetermined condition;

an associating unit that extracts, from a result of character recognition performed by the character recognition unit, a character string included in the caption region specified by the specifying unit, and that associates the character string with the character region from which the character string is extracted and the separate region;

a translating unit that translates to another language the resulting recognized characters; and a pasting unit that, based on the association between the character string and the other character region, pastes the resulting translation that includes the character string onto the same page as the separate region that is associated with the character string.

7. An image forming apparatus comprising:

an image forming unit that forms images onto a recording material; and a translation device comprising:

a region extracting unit that extracts a character region and a separate region from image data showing an image including characters, the separate region having structural elements different from structural elements of the character region;

a character recognition unit that recognizes characters in the region that is determined to be the character region by the region extracting unit;

a specifying unit that specifies a caption region from within the character region, the caption region being a region having a predetermined positional relationship with the separate region, the caption region having a size that satisfies a predetermined condition;

an associating unit that extracts, from a result of character recognition performed by the character recognition unit, a character string included in the caption region specified by the specifying unit, and that associates the character string with the character region from which the character string is extracted and the separate region;

a translating unit that translates to another language the resulting recognized characters; and a pasting unit that, based on the association between the character string and the other character region, pastes the resulting translation that includes the character string onto the same page as the separate region that is associated with the character string.

8. A translation method, the method comprising:

extracting a character region and a separate region from image data showing an image including characters, the separate region having structural elements different from structural elements of the character region;

recognizing characters in the region that is determined to be the character region by the extracting of the character region;

specifying a caption region from within the character region, the caption region being a region having a predetermined positional relationship with the separate region, the caption region having a size that satisfies a predetermined condition;

extracting a character string included in the caption region specified by the specifying of the caption region, from a result of the character recognition, and associating the character string with the character region from which the character string is extracted and the separate region;

translating to another language the resulting recognized characters; and based on the association between the character string and the other character region, pasting the resulting translation that includes the character string onto the same page as the separate region that is associated with the character string, wherein the above steps are performed by one or more processors.

9. A storage medium readable by a computer, the storage medium storing a program of instructions executable by the computer to perform a function, the function comprising:

extracting a character region and a separate region from image data showing an image including characters, the separate region having structural elements different from the structural elements of the character region;

recognizing characters in the region that is determined to be the character region by the extracting of the character region;

specifying a caption region from within the character region, the caption region being a region having a predetermined positional relationship with the separate region, the caption region having a size that satisfies a predetermined condition;

extracting a character string included in the caption region specified by the specifying of the caption region, from a result of the character recognition, and associating the character string with the character region from which the character string is extracted and the separate region;

translating to another language the resulting recognized characters; and based on the association between the character string and the other character region, pasting the resulting translation that includes the character string onto the same page as the separate region that is associated with the character string.

* * * * *